No. 865,699. PATENTED SEPT. 10, 1907.
J. J. HENDLER.
RUBBER VEHICLE TIRE.
APPLICATION FILED SEPT. 20, 1905.

Witnesses:
R. J. Jacker
Emilie Rose

Inventor:
John J. Hendler,
By Albert N. Graves,
Atty.

UNITED STATES PATENT OFFICE.

JOHN J. HENDLER, OF CHICAGO, ILLINOIS, ASSIGNOR TO TIGER TIRE COMPANY, A CORPORATION OF NEW YORK.

RUBBER VEHICLE-TIRE.

No. 865,699.  Specification of Letters Patent.  Patented Sept. 10, 1907.

Application filed September 20, 1905. Serial No. 279,221.

*To all whom it may concern:*

Be it known that I, JOHN J. HENDLER, a citizen of the United States, residing at Chicago, in the county of Cook and State of Illinois, have invented certain new and useful Improvements in Rubber Vehicle-Tires, of which the following is a specification.

This invention relates to improvements in rubber vehicle tires, and refers more specifically to an improved tire provided with a filling of tubular character adapted to combine the advantages of a pneumatic tire and a solid or filled tire which cannot collapse.

Among the salient objects of the invention are to provide a single tube tire which may be inflated with air but is provided with a filling of cellular cellulose and means for expanding the same by injecting liquid or steam therein; to provide a construction in which the tire is provided with a distributing tube extending throughout its full circumferential length and through which air and either liquid or steam may be injected into the cellular filling; to provide a construction in which the operation of the tire is substantially the same as that of an ordinary pneumatic tire when inflated, but which when punctured will not collapse, thereby avoiding injury to the tire or rim; and in general to provide an improved construction of the character referred to.

To the above ends the invention consists in the matters hereinafter described and more particularly pointed out in the appended claims.

The invention will be readily understood from the following description, reference being had to the accompanying drawings, in which—

Figure 1:
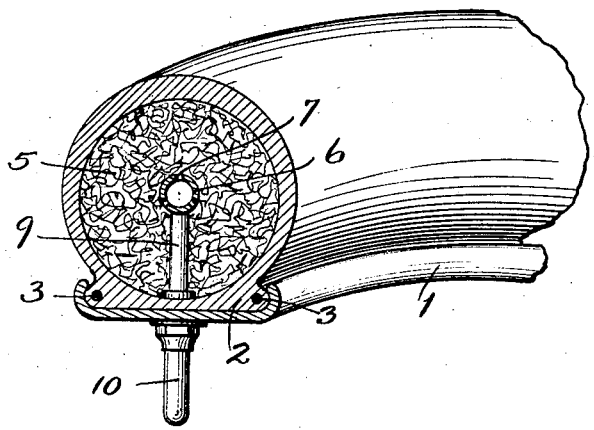
Figure 2:
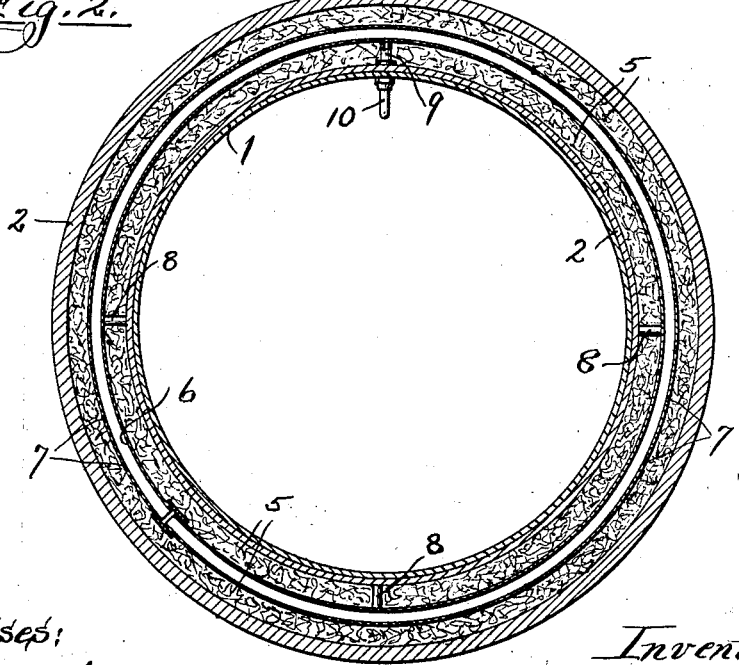

Figure 1 is a perspective view of a fragmentary portion of a tire embodying my invention, one end of said portion being shown in transverse section; Fig. 2 is a longitudinal section of a tire taken in the central plane of the wheel.

The problem of devising a rubber tire which will possess the resiliency of a pneumatic filling but nevertheless will be capable of at least a limited use after the tire has been punctured and thus prevent injury to the tire or rim during its travel to a point where it can be repaired is, of course, a very old one. I am aware that many expedients have been tried, such as making the tire of internally cellular structure, providing a multiplicity of separately inflated tubes within a single larger outer tube, or providing a tubular tire having a fibrous filling and which would give to the tire the characteristics of a cushion tire after puncturing. So far as I am aware, however it has not heretofore been proposed to provide a tire which after being punctured is capable of being distended and maintained in distended form independently of the pneumatic inflation. In the present case the invention is embodied in a single tube tire, the walls of which are made air tight so as to be adapted for inflation and the tire may be within the scope of the invention, secured to the rim of the wheel in any suitable or preferred manner.

Describing the construction shown in the drawings, 1 designates the rim of a vehicle wheel which in the present instance is of channel form and adapted to receive the base portion 2 of the tire; the latter being held within the channel by means of endless wires or rings 3—3 threaded through the lateral projections of the base, in a well understood manner.

The tire is provided with a filling of cellular cellulose, as indicated at 5 which is filled within the tube before the latter is permanently sealed and is compacted therein to a moderate extent but not sufficiently to interfere materially with the resilience of the substance nor to deprive it to any considerable extent of its porous or cellular character. This cellulose is of such character as to be light when dry resilient, highly porous, and of such nature as to absorb moisture and expand forcibly and to a large extent as it absorbs the liquid. I have found the pith of corn-stalks to be a cellulose admirably suited for this purpose and deem this the preferred substance because possessing the characteristics referred to in a marked degree. Preferably the material is in granulated form so as to insure uniformity of density and uniformity of expansion when moistened.

An important feature of the present invention resides in providing means whereby the cellulose may be thoroughly and evenly moistened after the tire is completed and in place upon the wheel and from time to time thereafter if necessary. To this end I construct the tire with an inner rigid tube 6 extending uninterruptedly the full circumferential length of the tire and provided at frequent intervals with perforations as indicated at 7 for the escape of steam or water, or other liquid from the interior of the tube into the surrounding cellulose. I prefer to locate the tube axially within the tire and as a convenient means of maintaining it in this position I provide a series of radial studs 8 extending from the inner side of the tire radially to and engage with the tube 6 and thus serving to hold the latter properly centered with the tire body. With the inner tube 6 is arranged to communicate a nipple 9 which extends radially inward through the side wall of the tire, and through the rim so as to be accessible for filling, in the usual manner, the end of the nipple is provided with a sealing cap 10 as usual.

In operation after the tire has been properly constructed as described and secured to the rim, I inflate the interior with air under pressure and also inject a limited amount of moisture, either in the form of water or steam, preferably using steam because of the ease with which uniformity of distribution may be secured. The inlet is then closed and the tire is in condition to operate; the injection of the liquid serving to expand the cellulose forcibly within the interior of the tire so that the supporting capacity of the latter is not entirely dependent upon the pneumatic inflation.

In case of a puncture the tire does not collapse instantly as in the case of an ordinary pneumatic tire, but on the contrary the air is compelled to filter slowly through the cellular interior to the point of escape. The resilience of the tire due to the filling of cellulose forms a sufficient cushion to enable the tire to run without danger of injury until a place is reached where it can be again repaired. If for any reason the body of moist cellulose is not found to sufficiently maintain the tire distended after puncture, it is only necessary to open the nipple and inject a further supply of water or steam in order to more fully expand the cellulose and thus sufficiently fill the tire.

I claim as my invention:

1. As a new article of manufacture, a vehicle tire of tubular form provided internally with a distributing tube perforated at intervals throughout its length, a filling of granulated cornstalk cellulose having the capacity to expand forcibly when moistened, interposed between the distributing tube and the exterior tube, and an inlet communicating with said distributing tube and extending out to the exterior of the tire.

2. As a new article of manufacture, a single tube tire provided with an internal endless distributing tube arranged approximately axially of the tire, a series of supporting studs extending between said distributing tube and the outer tube, a nipple arranged to communicate with the distributing tube and extending through the outer tube and provided with a sealing cap, and a filling of granulated cornstalk cellulose compacted within the outer tube and surrounding the distributing tube.

JOHN J. HENDLER.

Witnesses:
ALBERT H. GRAVES,
K. A. COSTELLO.